Dec. 14, 1937.　　　M. H. LOUGHRIDGE　　　2,101,861

CALCULATING AND RECORDING SYSTEM

Filed May 10, 1932　　　3 Sheets-Sheet 1

INVENTOR.
Matthew H. Loughridge

Dec. 14, 1937.    M. H. LOUGHRIDGE    2,101,861
CALCULATING AND RECORDING SYSTEM
Filed May 10, 1932    3 Sheets-Sheet 2

Inventor

M. H. Loughridge

INVENTOR.
Matthew H. Loughridge
ATTORNEY.

Patented Dec. 14, 1937

2,101,861

UNITED STATES PATENT OFFICE 2,101,861

CALCULATING AND RECORDING SYSTEM

Matthew H. Loughridge, Bogota, N. J.

Application May 10, 1932, Serial No. 610,879

7 Claims. (Cl. 235—58)

This invention relates to calculating and recording systems and particularly to a mechanism for making calculations and for recording these calculations by means of punched cards; the punched cards are used commercially and record quantities by the position of the punch holes laid out in vertical and horizontal rows on the card.

An object of this invention is to provide a calculating scale with means for recording the calculations on punched cards; another object is to provide a calculating scale with a multiplying mechanism and a totalizing mechanism for recording the product of weight and other factors; another object of the invention is to provide a calculating scale with a totalizer automatically operated according to the product of different factors. Other objects of the invention will be more particularly understood from the following specifications and the accompanying drawings, in which.

Figures 1, 2:
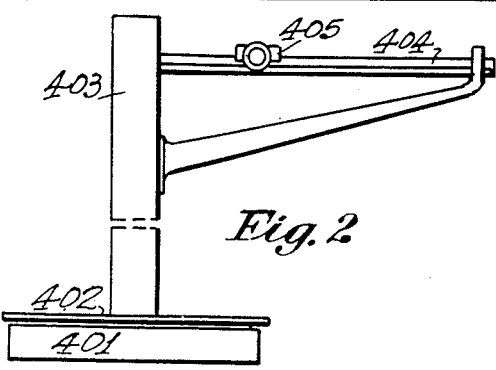
Fig. 1 illustrates one form of punched card which may be used with this invention.
Fig. 2 is one form of scale that may be used in applying this invention.
Figure 3:
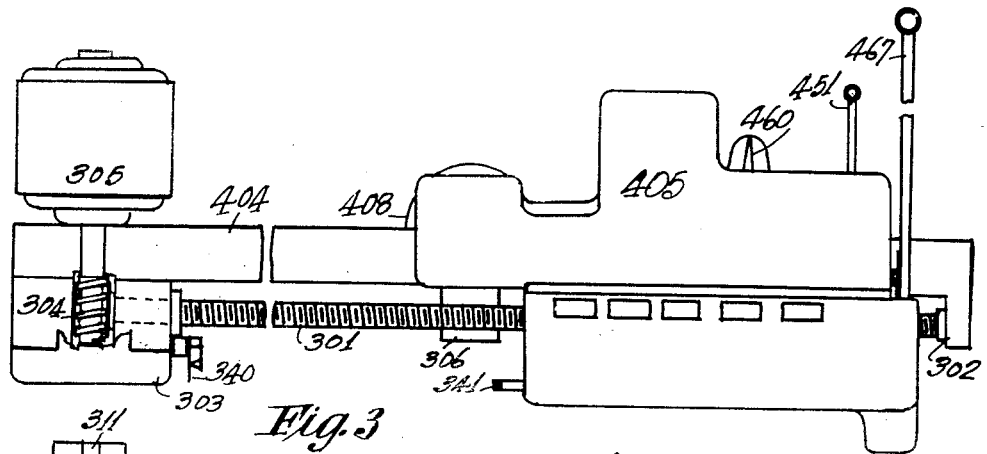
Fig. 3 is a side elevation of a motor operated carriage on the beam of the scale which embodies the calculating mechanism.

One form of weighing scale that may be used in applying this invention is indicated in Fig. 2 in which 401 is the base, 402 is the table, 403 is the stem, and 404 is the beam upon which the carriage or counterpoise 405 moves to establish a balance. The movement of this carriage on the beam operates a calculating mechanism which is designed to punch cards and to register weight, and charges associated with the weight. In the detailed plan view in Fig. 3 the carriage 405 is motor operated through the lead screw 301 operated by a worm gear at 304 and connected with the motor 305. The carriage may be manually operated on the beam instead of using the motor. The control of motor 305 is not shown in the present application. The beam is supported by a cross head 303 which is mounted on the usual knife edge bearings at 311 supporting the up-standing lugs 310.

The way-billing for a consignment, in addition to having a serial number, date, station or origin and destination, number of account, etc., has a column for weight, a column for charges, a column for paid out charges and a column for paid and collect charges. In general the cost of transportation is the product of the weight and the rate. The rate on the other hand is a product of classification and distance. These components are utilized in the mechanism of a weighing machine whereby punched cards, Fig. 1, are obtained at the time of weighing which form a complete way-bill for the consignment. The present application is a continuation in part of co-pending application, Serial No. 168,189, filed Feb. 14, 1927, now Patent 1,857,760, dated May 10, 1932.

The scale arm or steel yard of the weight-bridge is provided with a carriage or counterpoise which has a rotating member engaging a rack on the arm and operatively connected with a totalizing mechanism. It is also connected by two variable gears with another totalizing mechanism. The first totalizing mechanism represents "weight", one of the variable gears represents "classification" and the other variable gear represents "distance" and the second totalizing mechanism represents "charges." The classification and distances are adjusted by discs so that the charges are automatically computed at the time the weight is taken. The second totalizing mechanism is connected with the first totalizing mechanism by a shaft. A third totalizing mechanism represents "paid out" charges, or charges paid out to another carrier or for any other purpose. This mechanism is connected with the shaft through a ratchet so that it may be moved forward without disturbing the second totalizing mechanism or the weight totalizing mechanism. A suitable dial is provided and is gear connected to the shaft whereby the paid out charges may be set up on this totalizer. The same shaft operates another pair of totalizers through a clutch which brings either of said totalizers into operation on the shaft and thus computes the total charges that are paid or are to be collected.

The totalizing mechanism comprises a series of discs having ten positions corresponding to the first ten figures in the numerals. A complete revolution of the first disc moves the second disc one space, and a complete revolution of the second disc moves the third disc one space, and so on; the mechanism totalizes the rotation of the discs according to the principle of the familiar counters. These discs have spur gears on their periphery and after they have been set by the mechanism to register for a consignment they are brought into engagement with a rack on sliding bars which carry a punch over a perforated platen. These discs are then moved back to zero moving the sliding bars a distance corresponding to the distance which the discs were moved from zero. A card is placed on the platen and in this position the card is perforated according to the weight and charges of the consignment.

Figure 4:
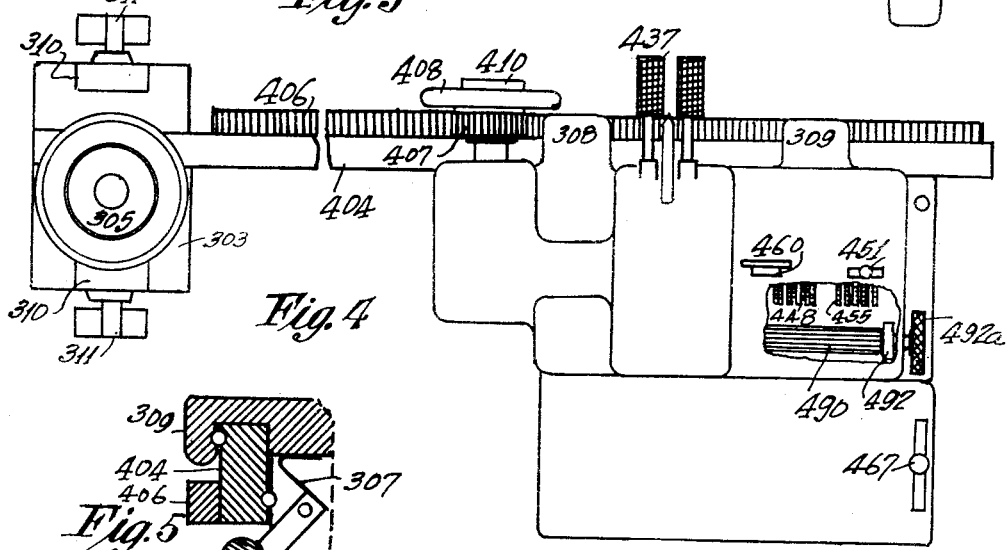
Fig. 4 is a plan view corresponding to Fig. 3.
Figure 5:
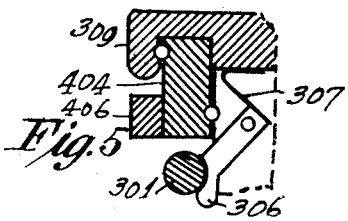
Fig. 5 is a sectional detail of the mounting of the carriage on the beam.
Figures 6, 7, 8, 9:
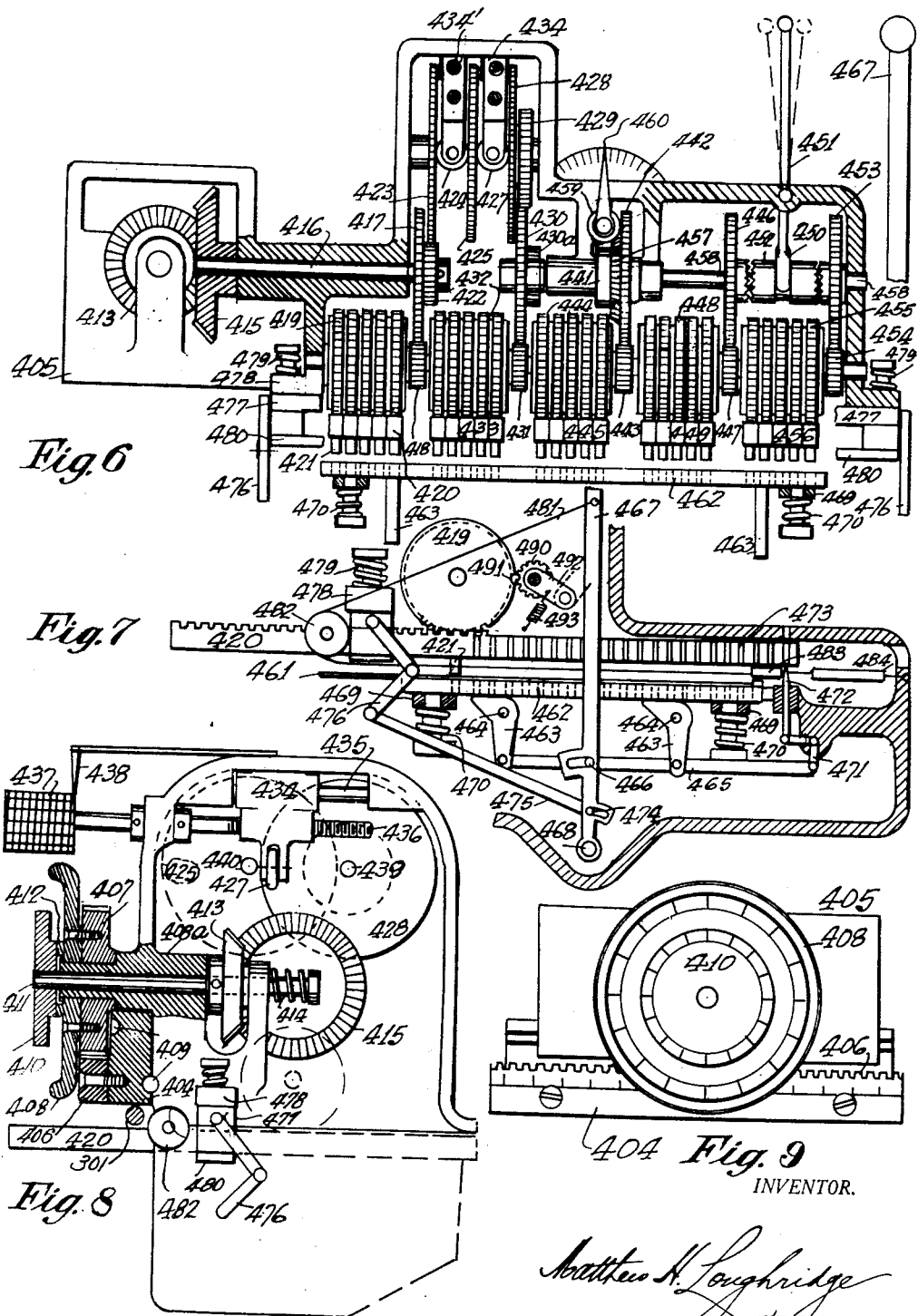
Fig. 6 is a vertical elevation, partly sectioned, showing the calculating mechanism.
Fig. 7 is an elevation, partly sectioned, at right angles to Fig. 6, showing the operation of the card punches.
Fig. 8 is an elevation, partly sectioned, showing the operation of the multiplying mechanism.
Fig. 9 is an elevation showing the carriage on the beam and its operating rack.

The scale in Fig. 2 is arranged with a computing apparatus for performing the operations described. The base 401 supports the table 402 and the stem 403. The weight is balanced by moving carriage or counterpoise 405 along the arm 404. The arm 404, Figs. 8 and 9 is provided with a rack 406 engaging the wheel 407 causing this wheel to rotate as the carriage is moved along the arm. This wheel is secured to the hand wheel 408 and rotates on the casting 408a. The shaft 411 carrying the adjusting knob 410 is held in frictional engagement with the hand wheel 408 at 412 by the spring 414. This enables the mechanism operated by shaft 411 to be adjusted relative to the position on the arm 404. Fig. 5 shows the ball bearings for the carriage at 308 and 309, Fig. 4 and means for disengaging the lead screw 301, from the carriage by arm 306, held in place by spring 307. Arm 306 disconnects the motor drive from the carriage and leaves the carriage free to be moved by hand on the steel yard.

The shaft 411, Fig. 8, drives the bevel gear 413 which in turn drives bevel gear 415 and shaft 416, Fig. 6, carrying the spur gears 417 and 422. The gear 417 engages gear 418, which operates the totalizing mechanism 419, through the arbor by a ratchet drive in one direction only, by a mechanism similar to a counting mechanism. Gear 422 engages gear 423 which is in the form of a disc. A corresponding disc 428, through gears 429 and 430, operates the counter shaft and the gear 431 of the totalizer 432. The axes of the discs 423 and 428 are in alignment. The disc 425 between the discs 423 and 428 is mounted on the axis 440 to one side of the axis 439 of disc 428 as indicated in Fig. 8. Discs 423 and 425 are operatively connected by an adjustable friction drive comprising the wheel 424, mounted in the frame 434', which slides on the bar 435 in response to the screw 436, which is rotated by the graduated member 437, moving under the fixed index 438. It is apparent that as wheel 424 moves in one direction it moves away from the axis 439 and towards the axis 440 and when it moves in the opposite direction these conditions are reversed thereby changing the gear ratio between 423 and 425. Thus wheel 425 is moved by disc 423 during the movement of carriage 405 by a gear ratio corresponding to that set up by the index 437. (Other means may be used for changing the calculations).

The wheel 425, Fig. 6, drives wheel 428 through the friction wheel 427 mounted in frame 434 which is positioned by a mechanism similar to that described in connection with wheel 424. With the arrangement described, it is apparent that starting from zero on the scale arm, the totalizer 419 will record weight and the totalizer 432 will record charges for this weight computed by adjusting the wheel 424 to represent classification and the wheel 427 to represent distance.

The spur wheel 430 connects to shaft 458 by the ratchet 430a so that this shaft may be advanced without affecting the totalizers 419 or 432. The spur wheel 442 is loosely mounted on shaft 458 but is connected thereto by the ratchet 441 so that the shaft can move forward independently of this wheel. This wheel is operated by the worm gear 457' engaging worm 459 which is mounted on a shaft connected with an index pointer 460 moving over a graduated dial. This wheel engages the gear 443 which operates the totalizer 444 and sets up the "paid out" charges as indicated on the dial by indicator 460, Fig. 3, and moves the shaft 458 forward a distance corresponding with these charges.

The clutch 452, Fig. 6, operated by the jaw 450 of the lever 451 rigidly connects either the spur wheel 446 or 453 to the shaft 458. Wheel 446 through gear 447 operates the "paid" totalizer 448 and the wheel 453 through gear 454 operates the "collect" totalizer 455 under the selection of lever 451.

The five totalizers shown in Fig. 6 thus operate as follows: The first totalizer records weight, the second records charges as a product of weight and rate, the third is manually set to record paid out charges, the fourth records the sum of the charges and the paid out charges, that is, the sum of the second and third totalizers and the fifth alternatively with the fourth records the same amount.

Referring to Fig. 7, it will be noted that the discs of the totalizer 419 are provided with gear teeth and engage slide bars 420 through a rack construction. These slide bars carry punches 421 over a perforated platen 462 upon which the card 461 rests in a predetermined position. When the operating handle 467 is moved to the left on its pivot 468, the pin 466 carries the bar 465 to the left, raising the plunger 472, by the crank 471, which engages the side slots 473 in the slide bars and insures the proper alignment of the punches 421. The cams 463 are also rotated on their pivots 464 thereby raising the platen 462 and punching the card. The platen 462 is restored by the springs 470 acting against the guides 469.

The normal position of handle 467 is to the right in which position the handle, through pin 474, rod 475 and crank 476, lowers 477 against the action of spring 479 bearing upon the frame 478, said spring being mounted on a headed stem connected to 477. It will be noted from Fig. 6 that 477 and 480 are a pair of spaced parallel bars between which the sliding bars 420 move, and thus the movement of handle 467 to the right releases the sliding bars 420 from the totalizer 419, the bars 433 from the totalizer 432, the bars 445 from the totalizer 444, the bars 449 from the totalizer 448 and the bars 456 from the totalizer 455. Thus the totalizers are released from the sliding bars and these bars during the normal operation of the mechanism may be reset to the starting position.

The movement of the handle 467 to the right, through connection 481 operating over pulley 482, draws the bar 483 forward against the action of spring 484. This bar engages the punches 421 and restores the sliding bars to the starting position which corresponds with zero on the card.

In operation, the class of the merchandise and the distance are established on the dials 437 and lever 451 is placed in the "paid" or "collect" position and the handle 467 is moved to the right. The mechanism is then moved from zero along the arm of the scale until a balance is reached. This moves forward the totalizers for weight, charges, and paid or collect. If paid out charges are to be included the index 460 is then moved around to indicate the amount which is recorded on the "paid out" totalizer and added to the paid or collect totalizers through the movement of shaft 458 by 460.

The next operation is to record the amounts registered by the totalizers on the punched card. For this purpose the lever 467 is moved to the central position shown in Fig. 7 permitting the slide bars 420, 433, 445, 449 and 456 to engage with the discs of the totalizers. In this position the totalizers are turned back to zero by bringing the pinion bar 490, Figs. 4 and 7 into engagement with all the discs of all the totalizers through the movement of arm 492 against the action of spring 493 and rotating this bar. Each of the discs is moved by this pinion bar until the gap 491 is reached where a tooth is missing on each disc and beyond which the disc cannot be turned by 490. This is the zero or starting position and it is apparent that this operation has moved each of the slide bars 420, 433, 445, 449 and 456, from the starting position, a distance corresponding to the distance that the totalizing discs were moved from the starting position. This places the punches 421 in position for perforating the card 461 by perforations located to correspond with the conditions set up. The arm 492 with spring 493, forms a toggle so that the spring holds the arm in the engaging and in the disengaging positions.

The type of totalizers shown is used in speedometers and comprises a series of discs having ten positions corresponding with the numerals 0 to 9. The disc to the right is operated by the mechanism and indicates units, the next disc is operated by the units disc by an engagement that occurs between the 9 and 0 position of the units disc and moves this disc one position; the other discs are similarly operated by the proceeding discs, so that one revolution of one disc moves the next higher disc one space. There is no connection between the discs except when this operation takes place, so that they are free to be turned back to the starting or zero position. A common way of securing this result is by a central shaft having a row of pins, one of which engages each disc, when they are to be reset, this engagement takes place at a predetermined position which, as the resetting shaft is rotated, brings all the discs to zero and resets the device. Constructions of this kind will be found in U. S. Patents 1,467,198; 1,400,106 and 1,214,568. It is apparent that this mechanism may be used without the scale arm simply by rotating shaft 416 corresponding to the weight of the consignment. Attention is directed to the fact that all the sliding parts move at right angles to the scale arm so that the operation of the mechanism does not affect the leverage of the counterpoise.

In the restoring of the totalizers, it will be noted that pinion bar 490 engages the same teeth as are used to operate the slide bars 420, but the small diameter of the pinion bar engages only a tooth at a time while several teeth are engaged at the same time by the slide bars.

It has been stated that the totalizers are moved by a ratchet drive as the counterpoise moves towards the position of balance, but if the counterpoise moves beyond the position of balance and has to be retracted, the ratchet will prevent the totalizers from being moved backwards a corresponding amount. In practice this does not present any difficulty, as in automatic scales of this type, the movement of the counterpoise is slowed up as the position of balance is reached and there is very little over-running of this position. The motor is controlled by light valves which reduce the current in the motor circuit, thereby slowing up the motor as the balance is reached.

The calculating apparatus is shown mounted on the steel yard of a scale, but it is apparent that the apparatus can be operated by moving the carriage on a beam that is fixed with a suitable rack for rotating the operating shaft according to the travel of the carriage.

The multiplying mechanism is made in the form of a variable drive for the totalizers. The factor of the multiplier is adjustable to the conditions desired. This factor is embodied in the friction wheels 424 and 427. The multiplying mechanism includes the pair of factors which are arranged to operate in series. That is the product of one multiplying factor is multiplied into the other in the final result.

The totalizers are made in the form of discs mounted on a common shaft, like the familiar counters. The result of the totalizers is not transferred to the cards by a system that selects a particular punch from a group to make the perforation, instead a single punch mounted on a sliding bar is positioned by the discs to make the perforation according to the figures of the totalizer. The totalizing discs may make several revolutions in registering the amount and while the amount is being set up these discs are disengaged from the punches. The punches are positioned by returning the discs to zero after the total has been registered. In this operation the movement of the discs will not exceed one revolution.

It should be understood that this invention admits of a variety of applications and may be applied in its component parts in tabulating systems generally and is not to be construed as limited to the applications shown.

Having thus described my invention, I claim:

1. A counter-poise for a scale having a beam with a rack bar, said poise mounted to move on the beam of the scale until a position of balance is reached and comprising a pinion in the counter-poise engaging said rack, a shaft connected with the pinion, a gear connected with the shaft and a first totalizing device connected with the gear, a multiplying device connected with said shaft and a second totalizing device connected with said multiplying device, said totalizing devices comprising a plurality of rotating members.

2. A counter-poise for a scale as defined in claim 1 with means for adjusting the multiplying device to vary the multiplying factor.

3. A counter-poise for a scale having a beam with a rack bar, said poise mounted to move on the beam of the scale until a position of balance is reached, comprising a pinion in the counter-poise engaging said rack, a shaft connected with the pinion, a gear connected with the shaft, a multiplying device connected with said gear and a totalizing device connected with said multiplying device comprising a plurality of rotating members.

4. A counter-poise for a scale as defined in claim 3 in which the pinion shaft is connected with the gear through a friction clutch.

5. A counter-poise for a scale having a beam with a rack bar, said poise mounted to move on the beam of the scale until a position of balance is reached, comprising a pinion in the counter-poise engaging said rack, a shaft connected with the pinion, a first multiplying device connected with said shaft, a second multiplying device connected with the first multiplying device, a totalizing device connected with said second multiplying device comprising a plurality of rotating members and means adjusting each of said multiplying devices according to predetermined conditions.

6. A counter-poise for a scale having a beam with a rack, said poise mounted to move on the beam of the scale until a position of balance is reached, comprising a pinion in the counter-poise engaging said rack, a totalizing device, a multiplying mechanism connected between the pinion and the totalizing device, said mechanism comprising a pair of discs mounted for rotation in the same axial line and an intermediate disc spaced from the pair of discs and off-centered from said pair of discs and free to rotate on its axis, a first friction wheel located between one of the pair and the intermediate disc and a second friction wheel located between the other disc of the pair and the intermediate disc and separate means for adjusting the position of each friction wheel relative to the centre of the discs whereby the totalizing device is operated in accordance with the positions of the friction wheels.

7. A counter-poise for a scale having a beam with a rack bar, said poise mounted to move on the beam of the scale until a position of balance is reached, comprising a pinion in the counter-poise engaging the rack, a totalizing device comprising a plurality of rotating members and multiplying means connecting said totalizing device with said pinion to rotate said members as the poise is moved on the beam.

MATTHEW H. LOUGHRIDGE.